United States Patent [19]

DePrez

[11] Patent Number: 5,423,035
[45] Date of Patent: Jun. 6, 1995

[54] METHOD FOR EVALUATING RELATIONAL DATABASE QUERIES WITH AUTOMATIC INDEXING AND ORDERING OF JOIN COMPONENTS

[75] Inventor: Daniel DePrez, Fullerton, Calif.

[73] Assignee: Hughes Aircraft Company, Los Angeles, Calif.

[21] Appl. No.: 996,305

[22] Filed: Dec. 23, 1992

[51] Int. Cl.$^6$ ............................................. G06F 17/30
[52] U.S. Cl. .............................. 395/600; 364/DIG. 1; 364/283.4
[58] Field of Search ........................................ 395/600

[56] References Cited

U.S. PATENT DOCUMENTS

| | | | |
|---|---|---|---|
| 4,497,039 | 1/1985 | Kitakami et al. | 395/600 |
| 4,769,772 | 9/1988 | Dwyer | 395/600 |
| 4,774,657 | 9/1988 | Anderson et al. | 395/600 |
| 4,811,207 | 3/1989 | Hikita et al. | 395/600 |
| 5,089,985 | 2/1992 | Chang et al. | 395/600 |
| 5,121,494 | 6/1992 | Dias et al. | 395/600 |
| 5,201,046 | 4/1993 | Goldberg et al. | 395/600 |
| 5,247,662 | 9/1993 | Minemura et al. | 395/600 |
| 5,257,365 | 10/1993 | Powers et al. | 395/600 |
| 5,301,317 | 4/1994 | Lohman et al. | 395/600 |
| 5,325,525 | 6/1994 | Shan et al. | 395/650 |
| 5,345,585 | 9/1994 | Iyer et al. | 395/600 |
| 5,367,675 | 11/1994 | Cheng et al. | 395/600 |

*Primary Examiner*—Paul V. Kulik
*Assistant Examiner*—Wayne Amsbury
*Attorney, Agent, or Firm*—W. K. Denson-Low

[57] ABSTRACT

A computer-implemented method that speeds up relational database qualification processing by emulating the function of a multiple dimension index, including constant expressions and joins involving complex functions. The method comprises the following steps. Establishing a command comprising a plurality of range variables related by join operators. Breaking up the qualification portion of the command into sub-expressions of the general type f(a) (join) f(b), or f(a) join "constant expression", where "a" and "b" are genetic range variables. The sub-expressions are then mapped onto component joins that may be used repeatedly for numerous commands. The component joins may contain boolean operators. Establishing a range variable processing order to resolve processing ambiguities, both in ordering of the range variables and in specialized join types such as outer-joins, and eliminate false roots. Evaluating the component joins to make a partial index for each join, wherein the partial index comprises a pointer table such that it may be used simultaneously with other partial index. Finally, looping over range variables using boolean processing to combine the join vectors, as needed, to complete the qualification. The present method eliminates the need for a user defined index. A processing gain is achieved without the associated increase in storage requirements normally encountered with a multiple dimension index. The measured performance gain for join processing is about two orders of magnitude, while the overall performance gain was measured at about an order of magnitude.

1 Claim, 6 Drawing Sheets

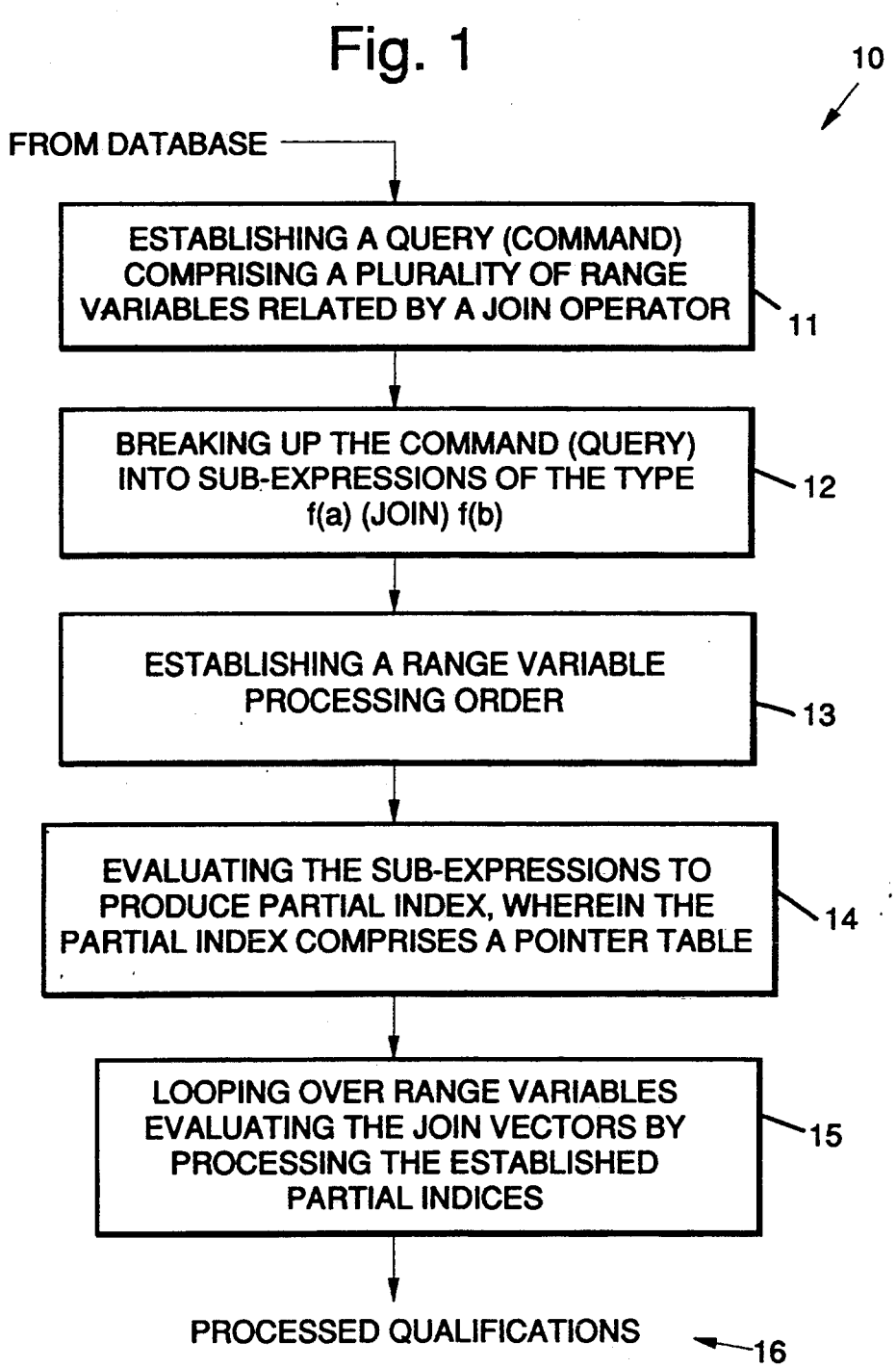

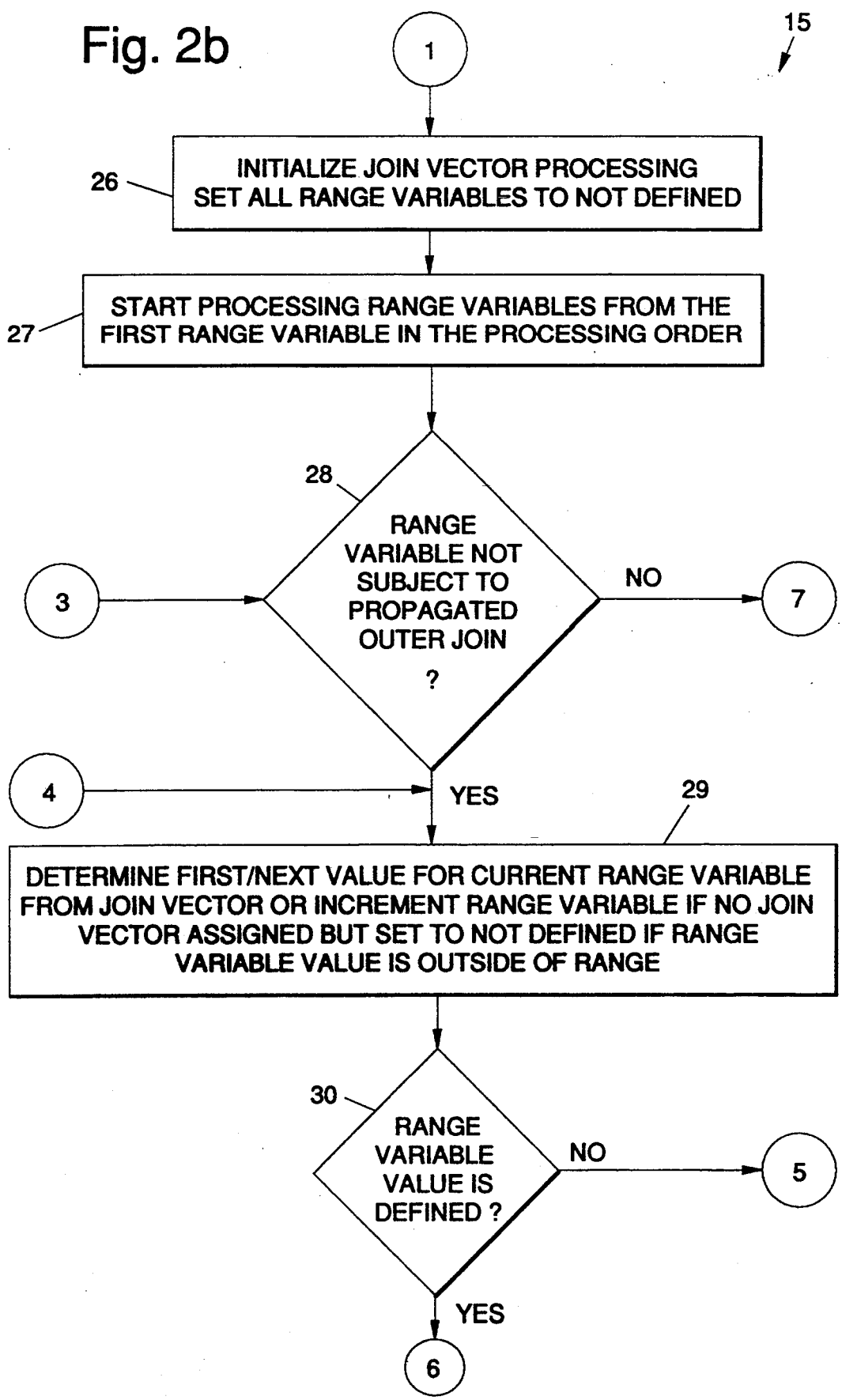

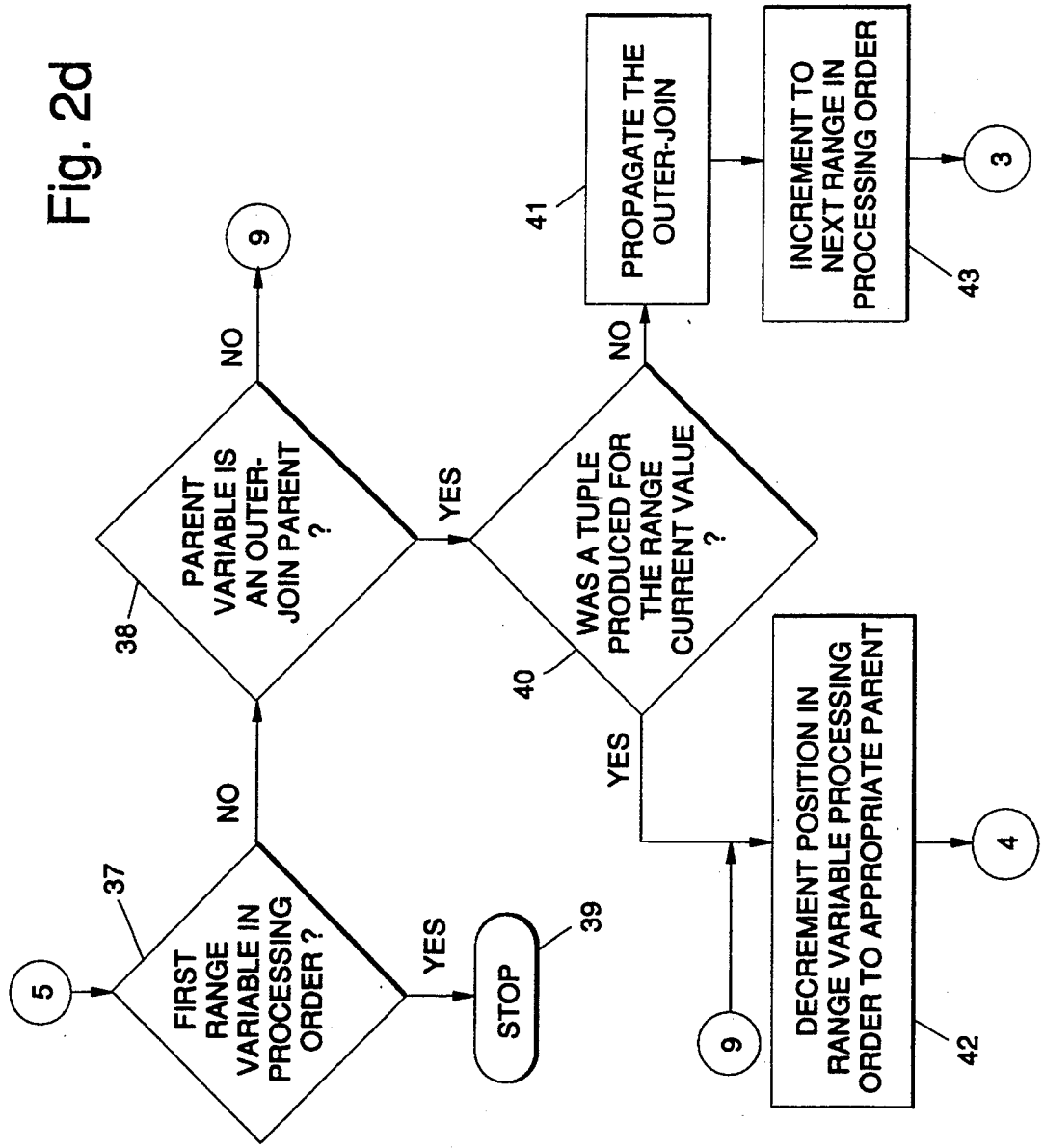

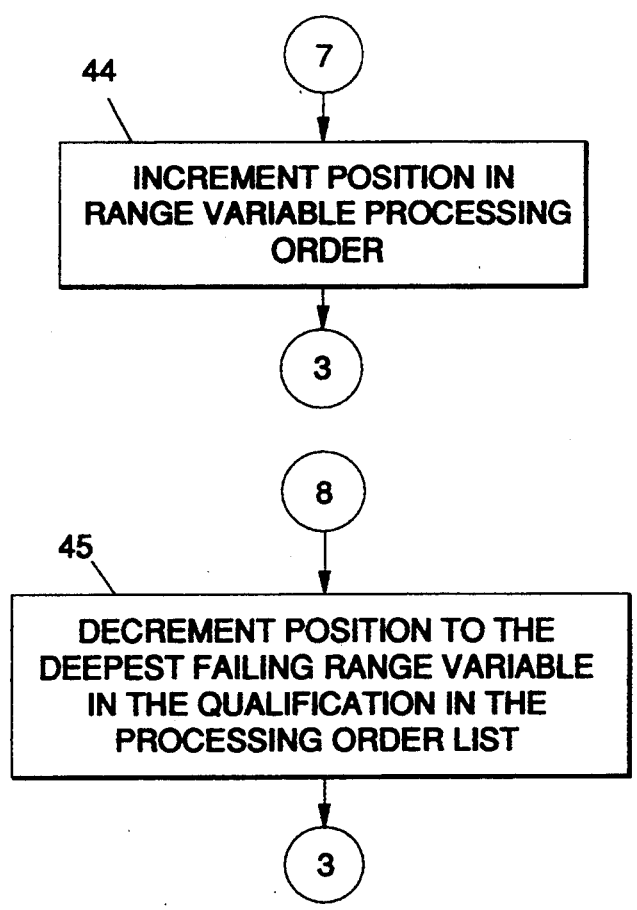
Fig. 2e
Fig. 2f
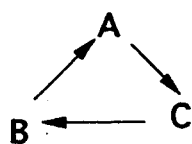
Fig. 3a
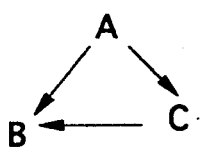
Fig. 3b
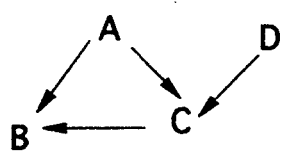
Fig. 4
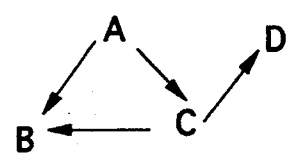
Fig. 5

METHOD FOR EVALUATING RELATIONAL DATABASE QUERIES WITH AUTOMATIC INDEXING AND ORDERING OF JOIN COMPONENTS

BACKGROUND

The present invention relates generally to computerized relational database systems and methods, and more particularly, to a method of evaluating relational database qualifications.

A relational database allows a user to modify and access a database by specifying the relationship of two or more relations (analogous to files) by writing an expression (also called a "qualification"). The flexibility of a relational database is what gives it its great user appeal. However there is a serious drawback to the flexibility of a relational database: processing the qualification is relatively slow, compared to conventional hierarchical databases.

Prior approaches to the processing of relational database qualifications used a combination of index and subsequent expression processing to complete the processing. Specifically the portion of the qualification that is not processed in the index is evaluated in the subsequent expression processing step. Since the expression processing step is many orders of magnitude slower than the index processing step, the choice of which portions of the qualification to treat as an index and which portions of the qualification to evaluate as expressions is critical to the product's processing speed.

Prior approaches protect themselves from this thorny problem by employing two tactics. First, the burden of specifying which index to create is shifted to the relational database user, and second, the user can specify which index to use manually. Hence the final responsibility for processing efficiency is placed upon the user. From the user standpoint this often makes achieving and maintaining good performance either costly or impossible. As a consequence the potential market advantage derived from a good database, or database based process, is lost.

Accordingly, it is an objective of the present invention to provide a method of speeding up relational database qualification processing. It is also an objective of the present invention to provide a method of speeding up relational database qualification processing that eliminates the need for a user defined index.

SUMMARY OF THE INVENTION

The present invention provides for a computer-implemented method that greatly speeds up relational database qualification processing, by emulating the function of a multiple dimension index, including constant expressions and joins involving complex functions. A unique feature of the present processing method is that it eliminates the need for a user defined index. The present invention performs relational database qualification processing in a much faster manner than conventional methods and requires no maintenance effort to maintain relational database performance. The advantages realized by the present invention are: more timely database response, reduced physical resource requirements, reduced manpower dedicated to maintaining relational database performance, and reduced collateral and dependent process impact.

In order to achieve the above and other objectives, the present invention provides for a computer-implemented processing method for performing relational database qualifications. The method comprises the following steps. First, establishing a command comprising a plurality of range variables related by join operators. Next, breaking up the qualification portion of the command into sub-expressions of the general type f(a) (join) f(b), or f(a) join "constant expression", where "a" and "b" are generic range variables. The sub-expressions are then mapped onto component joins that may be used repeatedly for numerous commands. The sub-expressions are a superset of the component joins. The component joins may contain boolean operators. Next, establishing a range variable processing order. Establishing the range variable processing order resolves processing ambiguities, both in ordering of the range variables and in specialized join types such as outer-joins, and eliminates false roots. Next, evaluating the component joins to make a partial index for each join, wherein the partial index comprises a pointer table such that it may be used simultaneously with other partial index. The result of conceptually combining the component joins and the processing order information are referred to as join vectors. Join vectors are a superset of partial index. Finally, looping over range variables using boolean processing to combine the join vectors, as needed, to complete the qualification. This process virtually eliminates the need for a subsequent processing step.

Breaking up the qualify portion of the command into sub-expressions involves manipulating the qualify portion of the command in accordance with the algebraic associative and commutative properties so that each part involves a join of either one range variable to a constant or two range variables to each other. Establishing a range variable processing order includes constructing a graph with range variables at the nodes and with generic joins between them, and wherein the generic joins are an indication of a functional relationship between two range variables. Each generic join is then assigned a directional component such that the range variable pointing to another range variable are referred to as parent and child respectively. The graph is then manipulated so that there are no ambiguous parent-child processing relationships between the ranges, such as circles, and there are no root range variables which may be eliminated by changing them into children. The parent-child relationship of one range variable to another through the generic joins is referred to as a "thread". Two parent range variables may have the same child range variable. Evaluating the component joins to make a partial index for each join involves evaluating the functional relationship of each tuple of the parent relation with each tuple of the child relation for the corresponding range variables and storing this result in tabular form. The use of space or processing saving techniques is not ruled out. Looping over range variables joining the established indices comprises looping over the range variables, starting at a root and then to each range that is a child with no unresolved parents. The join vectors are evaluated as required for the particular parent range variable to emulate a complex multiple dimension index as part of the looping over the range variables processing. If the product of evaluating the join vector is "null" looping over the range variables proceeds from child to parent, rather than from parent to child.

The present processing method has been tested in a production environment for use with relational databases for report generation applications. The measured performance gain for qualification processing is over two orders of magnitude. The overall performance gain was measured at over an order of magnitude. The baseline for these measurements consisted of several hundred commands from a production environment where continuous database performance tuning was in process. The reported gain is achieved without an abnormal amount of dedicated index storage. The present processing method is intended to operate upon an existing database developed and maintained using an established database product but adding functionality and/or processing capability, as well as serve as the basis for new relational database products.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 1 shows a flow diagram of a method of performing relational database qualification processing in accordance with the principles of the present invention;

FIGS. 2a through 2f show a more detailed flow diagram of the method of FIG. 1;

FIGS. 3a and 3b illustrate building a directed graph and assigning a range variable processing order;

FIG. 4 illustrates resolving processing ambiguities; and

FIG. 5 illustrates eliminating false roots.

DETAILED DESCRIPTION

Figure 2A:
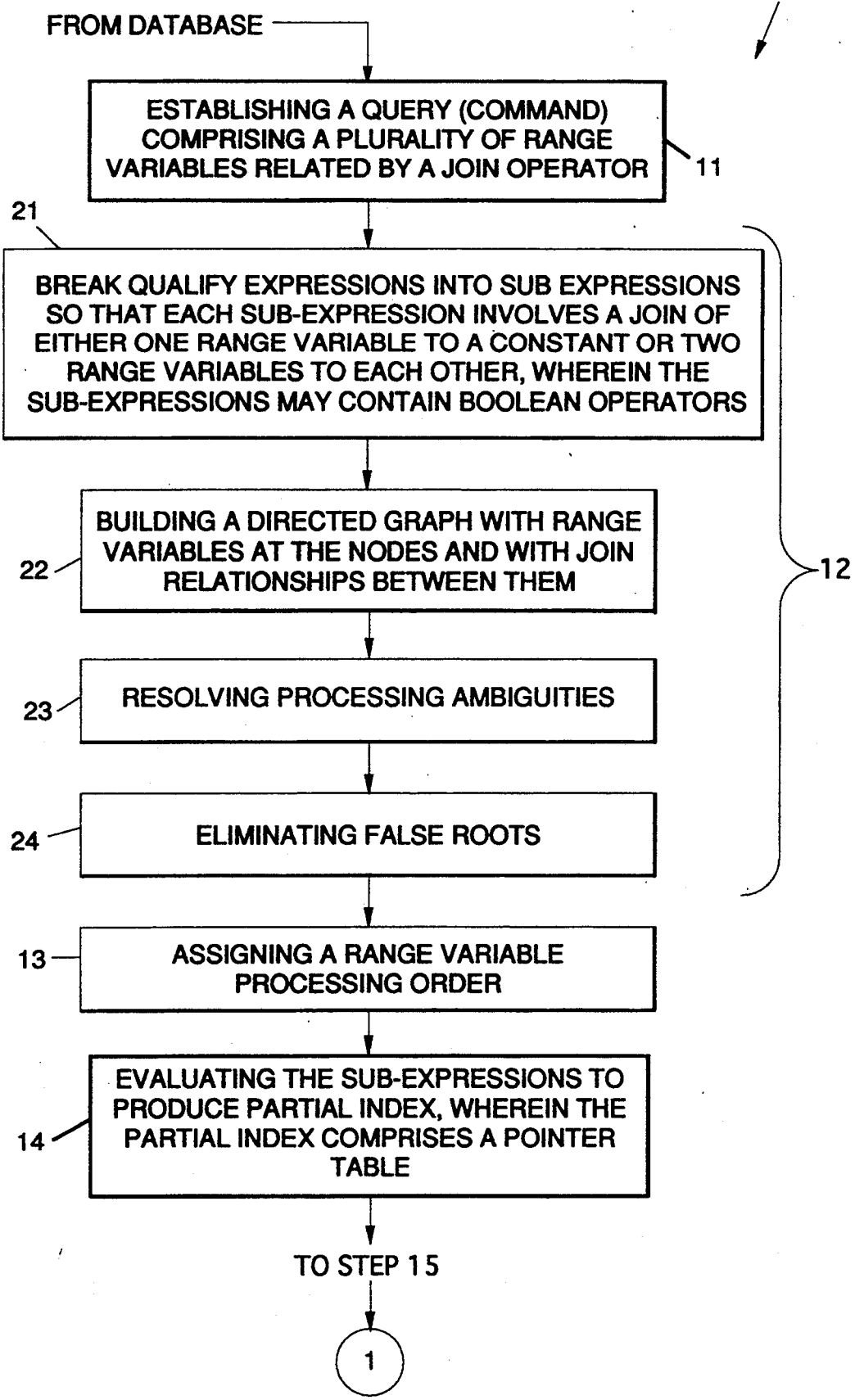

By way of introduction, and for the purposes of comparison, the following data illustrates a relational database retrieval command processed by means of a conventional relational database qualification process. The joins that are processed by means of an index using conventional processing methods are identified by a numbered footnote.

relation corresponding to a table (file), a plurality of attributes corresponding to columns (fields) of the relation, and a plurality of tuples corresponding to rows (records) of the relation. A qualify operation restricts the cross-product of two relations. The cross-product is formed by placing a tuple from one relation followed by every tuple from another relation. The qualify operation is comprised of joins that selectively control the commands operation, restricting the cross-product of the referenced relations. The qualify operation thus controls the target tuples retrieved by the operation. A target list controls the columns listed in the target tuple and hence projects the cross-product.

Referring now to the drawing figures, FIG. 1 shows a flow diagram of a computer-implemented method 10 of performing relational database qualification processing in accordance with the principles of the present invention. The method 10 comprises the following steps. The first step comprises establishing a query (command) 11 comprising a plurality of range variables related by join operators. The next step comprises breaking up the command (query) 12 into component joins of the type f(a) (join) f(b). The next step comprises establishing a range variable processing order 13. The next step comprises evaluating the sub-expressions 14 to establish partial index for each sub-expression, wherein the partial index comprises a pointer table. The final step comprises looping over range variables 15 evaluating the established join vectors as required.

The present method 10 processes all joins by means of join vectors, using boolean processes operating upon partial index, having a form such as $f(a)=f(c)$ and $f(b)=f(c)$, for example. In contrast, prior art processes use a cross-product of relations (as referenced through the range variables) for that portion of the relation that is not excluded by index processing, and then eliminates invalid target tuples which result from the cross-product by evaluating the cross-product results against the qualification statements.

---

```
range of A is RELATION_1
range of B is RELATION_2
range of C is RELATION_3
    retrieve (A.key,B.key,C.key)      <targetlist>
where
    A.comndid = C.comndid[1]          <qualify operations>
and (B.setnum > 0 or B.fldnum >
2)
and A.object = B.object[2]
and A.setnum = B.setnum[3]
and (B.setnum*128 + B.fldnum) =
C.record_id
and B.set_id = C.set_id
```

The joins which are processed using join vectors using the present method are designated on the same command are identified by numbered footnote below.

```
range of A is RELATION_1
range of B is RELATION_2
range of C is RELATION_3
    retrieve (A.key,B.key,C.key)      <target list>
where
    A.comndid = C.comndid[11]         <qualify operations>
and (B.setnum > 0 or B.fldnum
>2)[12]
and A.object = B.object[13]
and A.setnum = B.setnum[14]
and (B.setnum*128 + B.fldnum) =
C.record_d[15]
and B.set_id = C.set_id[16]
```

---

The method of the present invention is employed with a relational database that comprises at least one The method of qualify expression evaluation of present method 10 may be illustrated as follows, with reference to ranges "B" and "C".

A No join vector is used for this range variable, the range variable is simply stepped once over its allowed range of values.

B index by join vector which results from boolean combination of partial index of constant expression upon "B" and sub-expressions of "A" and"B" for the current value of "A" explicitly the partial index for the sub-expressions:

A.setnum=B.setnum
A.objectid=B.objectid
(B.setnum>0 or B.fldnum>2)

C index by join vector which results from boolean combination of partial index of sub-expressions of "A" and "C" for the current value of "A", and of partial index for sub-expressions of "B" and "C" for the current value of "B" explicitly the partial index for the sub-expressions:

A.comndid=C.comndid
B.set_id=C.set_id
(B.setnum* 128+B.fldnum)=C.record_id

The inclusion of the joins for A, B, to C is unique to the present processing method 10, and represents the central aspect thereof. However the ability to determine where to optimally resume the stepping process is also unique to the present processing method 10 and is an important optimization. An optimization of aggregate processing is also provided by the present method 10 wherein the dimensions of the aggregates are reduced through analysis of the aggregate expression and, if the join to the aggregate result fails, then a default result is joined.

Figure 2C:
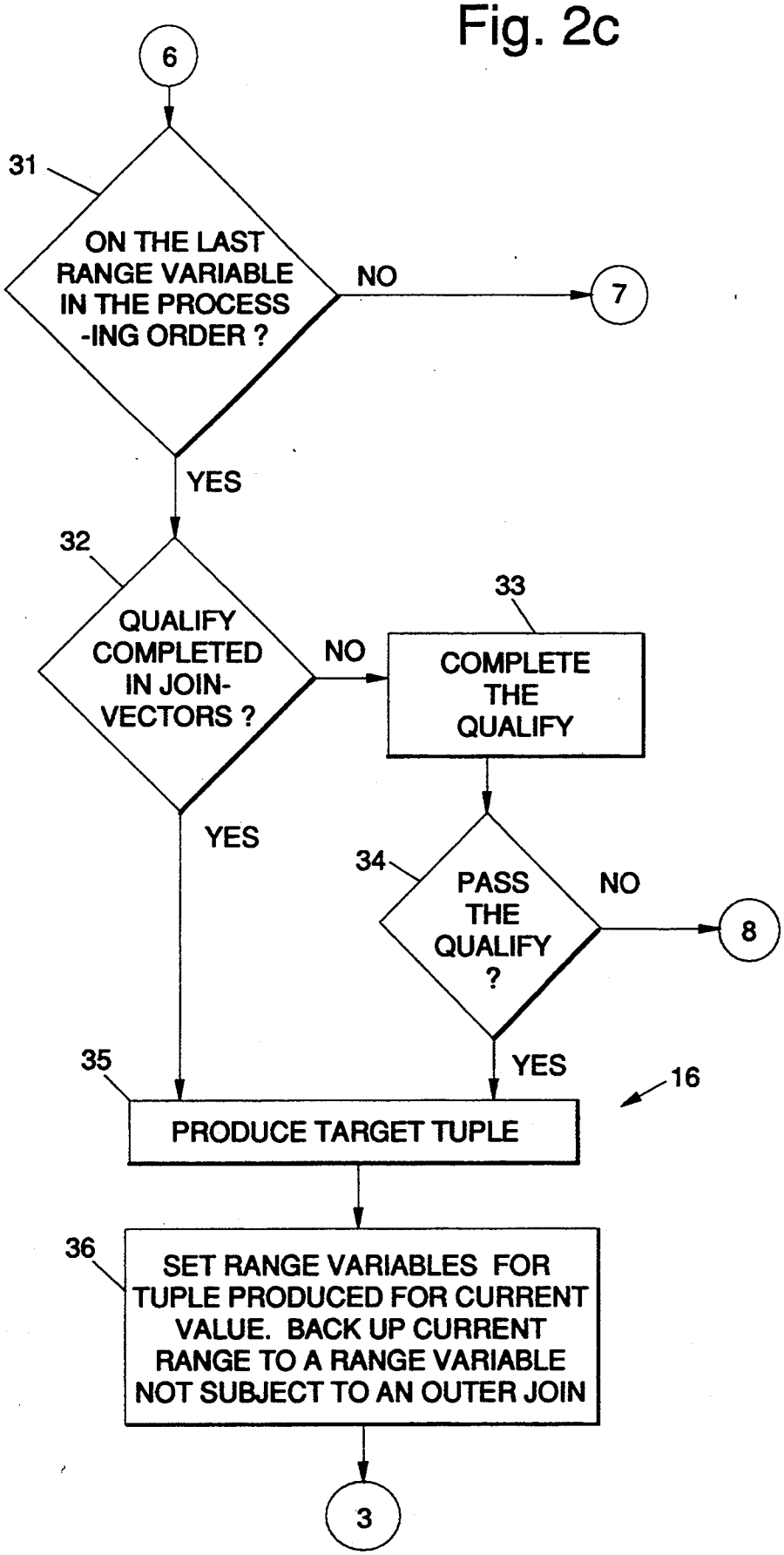

Given the above, FIGS. 2a-2f show a more detailed flow diagram of the method 10 of FIG. 1. The method 10 breaks qualify expressions into component parts 12 so that each part involves a join of either one range variable to a constant or two range variables to each other. These component parts may contain OR operators. The inclusion of AND operators in a sub-expression is a performance decision. Examples of typical component parts of the qualify portion of a relational database command are:

A.setnum=B.setnum
(B.setnum*128+B.fldnum)=C.record_id.

Component parts of the qualify expression in which the range variables are not segregated across the relational operators and that cannot be reprocessed to conform to this role, are often resource-expensive to produce and are excluded from join vector processing as a practical matter. The technique of assigning an alternative function into the partial index function, as an optimization to restrict cross-product evaluation of this class of joins, is useful. An example of such a join is A.setnum+B.setnum=C.setnum.

The present method 10 as shown in FIGS. 2a-2f comprises building a directed graph 22 (examples are shown in FIGS. 3a, 3b, 4 and 5 with range variables at nodes and with all join relationships represented between them. The join relationships are an abstraction of the functional relationship between two range variables as expressed in the subexpressions. Before the directed graph 22 may be used to facilitate processing of the qualify expression, the method 10 resolves processing ambiguities 23, eliminates false roots 24, and finally assigns a range variable processing order 13.

Steps 22, 23, 24, and 13 are graphically illustrated 3a, 3b, 4 and 5, respectively. More specifically, FIG. 3a illustrates building a directed graph 22 and also illustrates assigning a range variable processing order 13. This is a directed graph with join directions randomly assigned. The join directions go in a circle making the parent-child relationship ambiguous. This directed graph also has only one possible processing order wherein each range variable appears before it's parent. The processing order is "A", "C", "B". FIG. 3b shows a directed graph with join directions rearranged so that the parent-child relationships are defined. Range "A" is now a root (having no parents). FIG. 4 illustrates resolving processing ambiguities 23. A range variable "D" has been added to illustrate a graph with two root ranges. Both "A" and "D" do not have parents. FIG. 5 illustrates eliminating false roots 24. A range variable "D" has been added to illustrate a graph with two root ranges. Both "A" and "D" do not have parents. The direction of the relationship of "C" and "D" in FIG. 5 has been reversed so that "D" is now a grandchild of "A". This eliminates "D" as a root.

Each of the sub-expressions assigned a directional component may then be combined with other similarly processed sub-expressions for a given range so that collectively the sub-expressions form a join vector. Join vectors of this type replace corresponding qualify expressions. In this way join vectors are combined to emulate a complex multiple-dimension index. Additional join vectors may be derived from components of the qualify expression that irreducibly represent a join between more than two range variables. In this case the join vector does not replace the portion of the qualify it is derived from, since it represents a superset of the original expression.

The first step in the processing of the join vectors in the method 10 initializes the join vectors 26. Then starting at a first range variable 27, which is always a root, the method 10 loops over all range variables 28, in accordance with the range variable processing order (step 13), and as a function of the join vector processing. The method 10 checks the range variable if it is subject to outer-join processing (looping step 28) which is a special value which the range variable may assume in addition to the tuple values it may assume for the particular relation which it represents. This value allows the method to bypass the range variable increment until the outer-join has been evaluated. The range variables become subject to outer-join processing when the method 10 requires that the range variables be transitioned up the range variable processing list and the parent of an outer join is transitioned and no target list tuple has been produced for that range variable value. Ranges that have been designated as outer-joined are ignored by range process step 29 until the parent range that is outer-joined is re-encountered, when the range variables record numbers are set for initialization, and step range function continues as before.

Then the method 10 determines the next or first value for the range variable for the tuples for the relation which it represents in range process step 29. If the range variable is subject to join vector processing then the join vectors are combined in a boolean process which takes intersections or unions, as appropriate, and determines the next or first range variable value. If no value results from the join vector processing then the range variable value is set to undefined so that re-evaluation of the parent range values may proceed directly. This is a unique feature of this process. If however the range variable is not subject to join vector processing then it is incremented through the tuple values for the relation which it represents, until it has assumed all allowed values and then it is set to undefined.

Next the range variable is tested 30 to determine if it has assumed a defined tuple value. If it has, the range variable is tested 31 if it is the last range variable in the processing order (step 13). If it is, then a test 32 is made to see if the qualify is completed in the join vector processing. If the qualify is completely processed in the join vector processing then the target list is processed 35 to produce the target list tuple result. If the qualify was not completely represented then the remainder of the qualify is completed 33, and if the remainder of the qualify evaluates as true, determined in qualify processing step 34 then the target list is processed 35 to produce the target list tuple result. Then the method 10 sets the range variables to indicate that a tuple was produced for all current range variable values and the backs up in the range variable processing list to the deepest range variable in the list that is not subject to outer join processing 36. If however, at looping step 28, the range variable was subject to outer join processing then the current position in the range variable processing order 13 is incremented 44 and looping step 28 is repeated.

In the method 10 if the range variable is undefined when tested in step 30, then if the range variable is the first range variable in the processing order then the evaluation of the command is complete 39. If the range variable is not the first range variable in the processing order then if the range variable is immediately subject to an outer-join parent 38 then a test is performed to check if a tuple was produced for the range variables parents current value 40. If no value has yet been performed for the parent then the outer join is propagated to all subject outer-join children 41, and the processing continues down the range variable processing list. Otherwise all child combinations have been eliminated or evaluated and processing proceeds up the range variable processing order 42. The ability of the method 10 to decrement its processing of the range variable processing order to the deepest failing parent join is a unique feature of the method 10 and is critical to the processing speed of the method. Other processing methods are not able to reverse the processing order until joins involving multiple parents are detected in the qualify processing step 34. If the qualify processing step 34 fails then the method 10 sets the current range variable to the deepest failing range variable in the processing order 45 and proceeds with the range variable processing loop in step 28.

Complete details of an implementation of the method 10 including a procedural description language (PDL) are provided in the PDL DESCRIPTION. Those skilled in the programing art may use this PDL to generate code to implement the method 10 of the present invention. The technique of processing the join vectors at the parent ranges, rather at the child ranges is also provided by the present invention, but is not described in detail since it is a simple extension of the method 10.

The processing method 10 has been implemented and tested in conjunction with relational database report generation. The processing method 10 achieved a reduction of over an order of magnitude in the processing time required to process the reports. An overall performance gain of a factor of 20 was initially realized. Additional relational database processing brought this gain down to a factor of 14, unadjusted for additional processing load, but this is in itself is very good, since the above-described processing method 10 automatically determines optimal processing for the database manipulations and relations and required no database analysis or optimization. The qualify processing time improvement realized with the method 10, without the inclusion of input and output processing, was 2-3 orders of magnitude for historically troublesome commands. This was achieved with no reduction in processing speed for commands involving simple joins. The baseline relational database that was used as a benchmark for relative performance evaluation was a Britton-Lee based setup conversion process that has been in use for over five years, and which was heavily optimized.

Thus there has been described new and improved method of evaluating relational database qualifications. It is to be understood that the above-described embodiment is merely illustrative of some of the many specific embodiments that represent applications of the principles of the present invention. Clearly, numerous and other arrangements can be readily devised by those skilled in the art without departing from the scope of the invention.

PDL DESCRIPTION

A procedural description language (PDL) for the present method 10 described above is provided below. Those skilled in the programming art may use this PDL to generate code to implement method of the present invention.

| Data Structures | |
|---|---|
| Per Range Processing Order | |
| Outer-join flag | PARENT- "Outer-join to child relations" |
| | CHILD - "Child (grandchild...) of outer-join" |
| | BLANK - "not a parent or a child" |
| Outer-join status | PASS - "Some Tuple produced for range current record" |
| | OUTERJOIN - "No record yet produced for range current record |
| Max records | max value for record count |
| Current record | internal record count |
| Current range | range variable in processing list being looped on |
| Direction | 1 - go downward in range variable processing list |
| | −1 - go upward in range variable processing list |

STEP RANGES

Initialize "current-range" to
Initialize "direction" to "1"
Initialize all "outer-join-status" to "PASS"

-continued

```
Initialize all "current-record" to "0"
For "current-range", while > "0"
  if "record-number" for "current-range" >= 0
  then
    if direction < 0
    for each join
    if any "outer-join-status" is set to "OUTERJOIN" in list of joins
    then
      set "outer-join-status" to "PASS"
      perform propagate outer join
      set "direction" to "1"
    elseif ("outer-join-flag" is "PARENT"
      clear all subordinate range record numbers
    endif
    enddo
    if "range-type" is "SCAN"
      perform step scan type range
    else
      perform step join vector type range
    endif
  else
    if "range-type" is "SCAN"
      perform step scan type range
    else
      perform step join vector type range
    endif
  endif
  endif
  current-range" = "current-range" + "direction"
  if "current-range" is greater than "last-range" then
    perform Qualify processing and Target List processing
    <<< note: if the expression evaluates as true >>>
    <<< then all outer-join-status are set to "pass"
    set "direction" to "-1"
    decrement "current-range"
  endif
endfor
```

INITIALIZE INDEX

```
clear current-record
for each parent/index
set pointer-to-partial-index-list to first element in set-of-records
set end-of-list to last element in set-of-records
endfor
```

STEP INDEX

```
if current record = 0
  set current pt to 0 for each index
endif
set "new-record" to "current-record + 1"
set "index-point" to "first-index in partial index list of current-range"
do while index point >o
if new-record > "current-record of pointer-to-partial-index-list of index-
point"
  then
    increment "pointer-to-partial-index-list of index-point"
    if "pointer-to-partial-index-list" > "end-of-list"
    then
      clear "record-number" for "current-range"
      set "direction" to "-1"
      set current range to deepest range where null result occured
      goto ::return::
    endif
  elseif "new-record" < "current-record of pointer-to-partial-index-list of index-
point"
    set "new-record" to "current-record of pointer-to-partial-index-list of index-
point"
    reset "index-point" to "first-index"
  else
    set "index-point" to "next-index in partial index list"
  endif
enddo
set "current-record" to "new-record"
for each join
if "outer-join-flag" is "PARENT"
  set "outer-join-status" to "OUTERJOIN"
endif
endif
set "direction" to "1"
::return::
```

STEP SCAN

```
increment "current-record"
if "current record" > "max record" then
  clear "record-number" of "current-range"
```

```
set "direction" to "-1"
else
 for each join
  if "outer-join-flag" is "PARENT"
   set "outer-join-status" to "OUTERJOIN"
  endif
 enddo
 set "direction" to "1"
endif
```

What is claimed is:

1. A computer implemented method for performing relational database qualifications on a database comprising a plurality of tables, each table including fields and tuples, the method comprising the steps of:

(A) establishing a user query as to a predetermined set of tables;

(B) reducing the user query into component joins in the form of f(A) join f(B), or constant join f(A), wherein f(A) represents a function upon the fields of a table A and f(B) represents a function upon the fields of a table B;

(C) establishing a processing order for the tables, wherein the processing order is selected so as to be consistent with that required by any outer-joins in the user query, wherein the first in order table comprises the root;

(D) evaluating each component join to produce respective pointer table indexes, wherein each pointer table index contains pointers to tuples in a child table and wherein one or more indexes that point to a particular table comprise a join vector for that table;

(E) ordering the join vectors in same order as the processing order on the basis of the associated tables;

(F) defining respective range variables for each of the tables of the predetermined set of tables, wherein each range variable is used as a pointer to a current tuple of the associated table and will assume values determined by (a) processing of the join vector for the associated table if the associated table is referenced by a join vector, or (b) incrementing through the associated table if the associated table is not referenced by a join vector;

(G) determining range variable values as follows:

(a) for a table referenced by a join vector, successively evaluating the associated join vector for each table in the processing order to determine an associated range variable value, wherein evaluation of a join vector comprises determining a set of pointers currently pointed to by each index in the joint vector and taking an intersection or union of each set of pointers as determined by the relationships of component joins corresponding to the indexes in the joint vector;

(b) stepping forward in the table processing order for null results of the join vector evaluation enclosed by an outer join;

(c) stepping backward in the relation processing order for null results of a join vector evaluation not enclosed by an outer joint;

(d) for a table not referenced by a join vector, incrementing the range variable to the next tuple in the table;

(e) stepping forward to the next table in the table processing order if the last tuple of the table has not been processed;

(f) stepping backward in the processing order to the previous table if the last tuple in a table has been processed and terminating evaluation if there is no previous table; and (H) producing a query result each time the range variable of the last table in the processing order is determined in step (G).

* * * * *